US012241436B2

(12) United States Patent
Johnson et al.

(10) Patent No.: US 12,241,436 B2
(45) Date of Patent: Mar. 4, 2025

(54) AIR INTAKE PORT FOR A LEAN-BURN GASOLINE ENGINE

(71) Applicant: JAGUAR LAND ROVER LIMITED, Warwickshire (GB)

(72) Inventors: Jack Johnson, Coventry (GB); Lyn McWilliam, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 18/284,123

(22) PCT Filed: Mar. 26, 2021

(86) PCT No.: PCT/EP2021/057933
§ 371 (c)(1),
(2) Date: Sep. 26, 2023

(87) PCT Pub. No.: WO2022/199844
PCT Pub. Date: Sep. 29, 2022

(65) Prior Publication Data
US 2024/0167441 A1 May 23, 2024

(51) Int. Cl.
*F02M 35/10* (2006.01)

(52) U.S. Cl.
CPC *F02M 35/10091* (2013.01); *F02M 35/10262* (2013.01)

(58) Field of Classification Search
CPC ....... F02M 35/10091; F02M 35/10262; F01M 35/10098
See application file for complete search history.

(56) References Cited

U.S. PATENT DOCUMENTS

| | | | |
|---|---|---|---|
| 4,726,341 A | 2/1988 | Muranaka et al. | |
| 5,167,211 A * | 12/1992 | Fukuma | F02M 35/10216 123/308 |
| 2005/0115540 A1 | 6/2005 | Yi | |
| 2009/0007860 A1* | 1/2009 | Kato | F02M 35/162 123/41.85 |

FOREIGN PATENT DOCUMENTS

JP H11107764 A 4/1999

OTHER PUBLICATIONS

International Search Report and Written Opinion of the International Searching Authority for International application No. PCT/EP2021/057933 dated Dec. 2, 2021.

* cited by examiner

*Primary Examiner* — Jacob M Amick

(74) *Attorney, Agent, or Firm* — Carlson, Gaskey & Olds, P.C.

(57) ABSTRACT

An air intake port (10) for a lean-burn gasoline engine (110) comprises an air inlet (14), at least one air outlet (15*a*, 15*b*), and an air channel connecting the air inlet (14) to the at least one air outlet (15*a*, 15*b*). The air channel comprises an air channel floor (42) and an air channel ceiling (41). The air channel floor (42) is at least substantially flat in a direction of air flow in a region adjacent to the air outlet (15*a*, 15*b*).

10 Claims, 7 Drawing Sheets

AIR INTAKE PORT FOR A LEAN-BURN GASOLINE ENGINE

TECHNICAL FIELD

The present disclosure relates to an air intake port for a lean-burn gasoline engine, to a lean-burn gasoline engine and to a vehicle with such an engine.

BACKGROUND

In classic internal combustion engines, gasoline burns best when it is mixed with air in the proportions of 14.7:1 (lambda=1). Most modern gasoline engines used in vehicles tend to operate at or near this so-called stoichiometric point for most of the time. Ideally, when burning fuel in an engine, only carbon dioxide (CO2) and water (H2O) are produced. In practice, the exhaust gas of an internal combustion engine also comprises significant amounts of carbon monoxide (CO), nitrogen oxides ($NO_x$) and unburned hydrocarbons. It is desirable to increase fuel efficiency and reduce unwanted emissions.

One possible route for increasing fuel efficiency is to burn the fuel with an excess of air. Burning fuel in such an oxygen-rich environment is usually called lean-burning. Typical lean-burn engines may mix air and fuel in proportions of, for example, 20:1 (lambda>1.3) or even 30:1 (lambda>2). Advantages of lean-burn engines include, for example, that they produce lower levels of CO2 and hydrocarbon emissions by better combustion control and more complete fuel burning inside the engine cylinders. The engines designed for lean burning can employ higher compression ratios and thus provide more efficient fuel use and lower exhaust hydrocarbon emissions than conventional gasoline engines. Additionally, lean-burn modes help to reduce throttling losses, which originate from the extra work that is required for pumping air through a partially closed throttle. When using more air to burn the fuel, the throttle can be kept more open when the demand for engine power is reduced.

Lean burning of fuel does, however, also come with some technical challenges that have to be overcome to provide an engine that is suitable and optimised for efficiently burning hydrocarbons in an oxygen-rich environment. For example, if the mixture is too lean, the engine may fail to combust. At low loads and engine speeds, reduced flammability may affect the stability of the combustion process and introduce problems with engine misfire. A lower fuel concentration also leads to less power output. Because of such disadvantages, lean burn is currently only used for part of the engine map and most lean-burning modern engines, for example, tend to cruise and coast at or near the stoichiometric point.

In order to enable the lean burning of fuel over a larger portion of the engine map, the engine needs to be designed in such a way to enable a large air flow into the combustion chamber and to ensure a reliable combustion process that will effectively burn all fuel, despite the oxygen rich conditions.

It is an aim of the present invention to provide an improved lean-burn engine.

SUMMARY OF THE INVENTION

Aspects and embodiments of the invention provide an air intake port for a lean-burn engine, a lean-burn engine and a vehicle with such an engine. The lean-burn engine may be suitable for use with gasoline as described herein. Alternatively or in addition thereto it will be appreciated that the lean-burn engine may be suitable for use with other fuels, such as hydrogen, for example. Aspects and embodiments of the invention are defined in the context of lean-burn gasoline but it will be appreciated that the fuel type can be substituted.

According to an aspect of the present invention there is provided an air intake port for a lean-burn gasoline engine. The air intake port comprises an air inlet, at least one air outlet, and an air channel connecting the air inlet to the at least one air outlet. The air channel comprises an air channel floor and an air channel ceiling. The air channel floor is at least substantially flat in a direction of air flow in a region adjacent to the air outlet.

Prior art air intake ports are typically tubular with a circular or quasicircular cross section. The cylinder heads to which the air intake ports are attached are generally located centrally in the engine with air inlets that are often slightly inclined outward, relative to the horizontal. Air intake ports draw in air from both sides of the engine and guide it to the cylinder heads. As a consequence of the position of the air inlet of the air intake ports and the location and orientation of the air inlets of the cylinder heads, the air intake ports often comprise a bend to transition from a primarily horizontal flow direction near the inlet to a primarily downward direction near the outlet.

The inventors of the current invention have observed that with this common design a significant portion of the incoming air flow, upon leaving the air intake port, follows the internal wall of the combustion chamber. When adhering to the combustion chamber wall, this portion of the incoming air flow may move directly towards the bottom of the combustion chamber. The inventors have found that this is not the ideal air flow pattern for a lean-burn gasoline engine. Instead, the currently proposed design of the air intake port intends to create and promote a 'tumble' that allows a large volume of intake air to first flow along a roof of the combustion chamber towards the opposite side of the chamber. There, the air flow goes down along the rear wall to finally move up towards the air inlet, along the nearest wall (i.e. nearest to the air inlet) of the combustion chamber. With an air channel floor that is at least substantially flat in a direction of flow in a region adjacent to the air outlet, flow separation at the combustion chamber inlet significantly improved, thereby allowing the incoming air to first flow across the chamber before descending into the chamber. As a result, the desired tumble is achieved.

In an embodiment of the invention, the air intake port comprises two air outlets. The air channel connects the air inlet to the two air outlets and comprises an upstream common duct and two downstream port legs. The two downstream port legs branch off from the common duct at a bifurcation point. In this embodiment, the air channel floor is at least substantially flat in a direction of flow in at least a downstream half of each of the port legs. In a preferred embodiment, the air channel floor even is at least substantially flat in a direction of flow along a full length of each of the port legs. The terms upstream and downstream are herein used to refer to parts of the air intake port relative to flow of air through the air intake port in its normal use with a lean-burn gasoline engine. The predominant air flow direction is from an upstream position to a downstream position. It follows that in normal use the engine is downstream of the air intake port.

In addition thereto, the air channel floor may be at least substantially flat in a direction of flow in at least a downstream half or even along a full length of the common duct.

A uniformly flat floor throughout the air channel helps to achieve a stable and undisturbed high-volume air flow that detaches from the underlying surface and is launched into the combustion chamber when reaching the end of the air intake port.

In the foregoing, the term 'substantially flat' may, e.g., be defined as having a difference between a minimum inclination and a maximum inclination that is less than 5 degrees. Preferably, the flat portion of the air channel floor is designed such that the difference between the minimum and maximum inclination is less than 2, or even 1, degrees.

It is noted that a uniformly flat floor in the direction of airflow does not exclude the possibility of the floor being curved in other directions. On the contrary, as already indicated above, air intake ports are typically tubular with a circular or quasicircular cross section, which means that the floor surface is flat in the direction of air flow only.

Furthermore, in a transition zone leading to the bifurcation point where the common duct splits into the two port legs, a floor and ceiling of the common duct may be shaped to provide a gradual transition between the single common duct and the two separate port legs. As will be explained in more detail below with reference to the Figures, in this transition zone the floor of the common duct may include a curved or sloped portion that provides for a smooth separation of a common air flow in the common duct into two separate air flows in the port legs. However, even if such a transition zone with a curved or sloped portion is provided, this will still allow for the floor of the common duct to be at least substantially flat in a direction of air flow. The portions that are sloped or curved form a wall or separator between the two port legs. The air flow at either side of that wall can still follow a substantially flat floor.

According to a further aspect of the invention, a lean-burn gasoline engine is provided which comprises at least one air intake port as described above. A combustion chamber with at least one air inlet being is connected to the at least one air outlet of the air intake port. The air inlet of the combustion chamber comprises a throat where the air outlet of the air intake port meets the air inlet of the combustion chamber. A movable valve is arranged to move between a closed state for closing off the air inlet of the combustion chamber and an opened state wherein intake air can flow from the air intake port into the combustion chamber.

In a preferred embodiment of this lean-burn gasoline engine, the valve comprises a bottom surface that faces the combustion chamber and a top surface that faces the air intake port. The air intake port and the valve are arranged such that when the valve is in its opened position, the complete bottom surface of the valve is positioned below the air intake port. This allows the separated air flow leaving the air intake port to flow along the roof of the combustion chamber and towards the opposite chamber wall with minimal disturbance by the valve it has to pass.

In a preferred embodiment, the air intake port and the valve are arranged such that even when the valve is half-way between its closed position and its opened position, the complete bottom surface of the valve is positioned below the air intake port. This further allows reduced flow disturbance by the valve while the valve is still opening, thereby facilitating the creation of the desired tumble as soon as the valve is opened. In alternative embodiments, the complete inlet valve face drops below the air intake port when the valve is, e.g., 75% open.

In a further embodiment, the air intake port and the valve are arranged such that when the valve is in its opened position, also the complete top surface of the valve is positioned below the air intake port, which may lead to even less disturbance of the air flow and therefore a more prominent and stable tumble.

By providing an air channel with a smooth and even surface, and with a substantially constant inclination at least in the region adjacent to the air outlet, a mostly undisturbed air flow through the air channel is obtained and detachment of the air flow at the air outlet of the air intake port is promoted. In addition thereto, a sharp edge at the air channel end and/or a large enough angle with the throat may further improve the air flow detachment.

Preferably, the throat provides a sharp edge with the channel floor, such as to promote a separation of an incoming air flow from a combustion chamber wall. Without this sharp edge, there is a risk of the incoming air flow adhering to the combustion chamber wall and bending down the corner against the direction of the desired tumble. The sharp edge helps the air flow to continue in the flow direction it has at the end of the air channel and to be launched in a direction along the roof of the combustion chamber. To further increase the desired tumble motion, the throat may provide a smooth edge with the channel ceiling, such as to adhere an incoming air flow to a combustion chamber ceiling. It is noted that the throat is a circular opening that has an interface with the channel floor as well as with the channel ceiling. If a continuous circular opening that can be machined in a single cut is preferred, a compromise may need to be found between the sharpness of the edge near the air channel floor and the smoothness of the edge near the air channel ceiling.

In preferred embodiments, the angle between the channel floor and an adjacent portion of the throat is at least 225 degrees. However, angles closer to, or even beyond, 270 degrees are even more preferred. The larger the angle, the smaller the chance that the airflow will adhere to the throat surface and finds a way down into the cylinder immediately upon entering.

It is further preferred that the throat provides a smooth edge with the channel ceiling, such as to adhere an incoming air flow to a combustion chamber ceiling. By adhering to the combustion chamber ceiling, the air flow is assisted to cross the chamber towards the opposite chamber wall and thereby provide the desired tumble motion.

According to yet another aspect of the invention, a vehicle is provided comprising a lean-burn gasoline engine as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
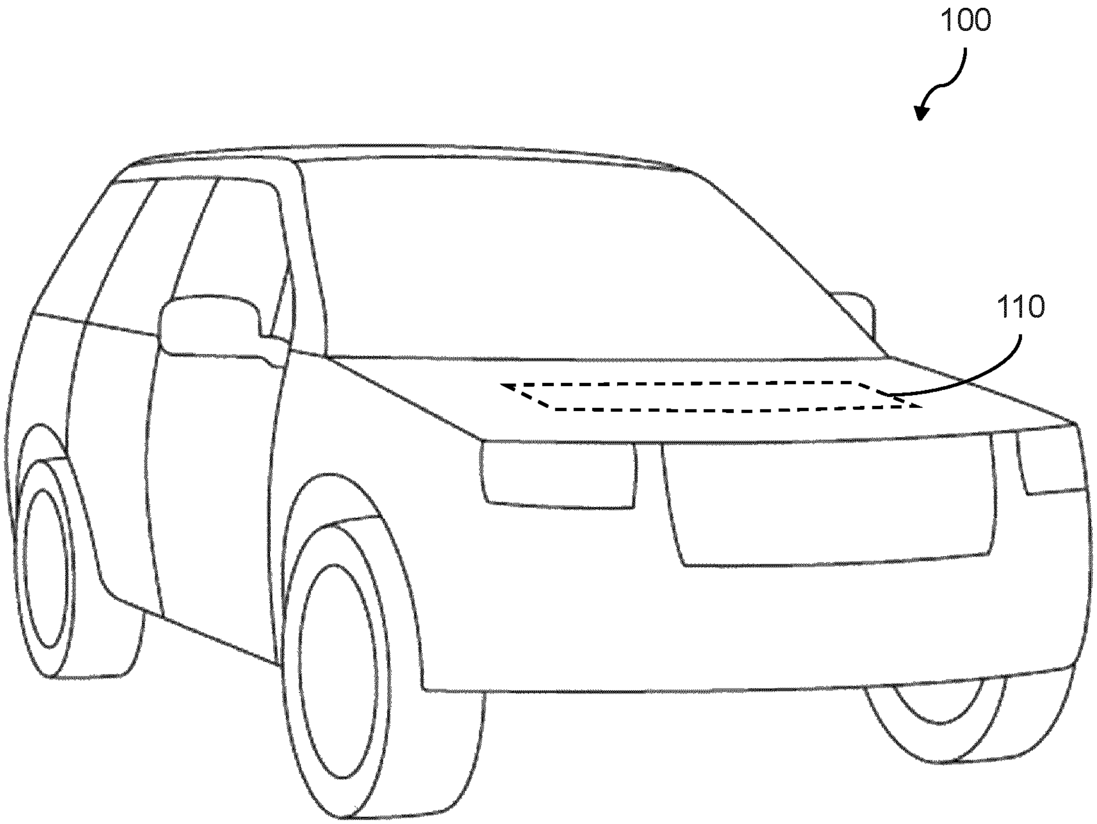
FIG. 1 shows a vehicle in which the invention may be used.

FIG. 1 shows a vehicle 100 in which the invention may be used. In this example, the vehicle 100 is a car, but the invention is equally applicable to other vehicles driven by a lean-burn gasoline engine 110. As mentioned above, it is to be noted that air intake port according to the invention and as described herein can be advantageously used in engines burning other fuels or fuel mixtures than gasoline. For example, the air intake port would be useful in a hydrogen burning internal combustion engine. In this vehicle 100, the lean-burn gasoline engine 110 is positioned in the front and coupled to a drivetrain to drive the front and/or rear wheels of the vehicle 100. The energy needed for driving the vehicle 100 is provided by burning fuel in the engine's cylinders causing the cylinder pistons to drive a crankshaft that is mechanically connected to the vehicle's drivetrain.

Compared to classic internal combustion engines, the lean-burn engine 110 of this vehicle 100 burns the fuel with an excess of air in the air-fuel mixture. Lean-burn engines may mix air and fuel in proportions of, for example, 20:1 (lambda>1.3) or even 30:1 (lambda>2). Advantages of lean-burn engines include more efficient fuel use and lower exhaust hydrocarbon emissions than conventional gasoline engines.

In order to enable the lean burning of fuel over a large portion of the engine map, i.e. in a large range of different engine speeds as well as engine output power or torque, the engine 110 is designed in such a way to enable a large air flow into the combustion chamber and a good mixing with the relatively small amount of fuel that is to be burnt to ensure a reliable combustion process that will effectively burn all fuel, despite the oxygen rich conditions.

Figure 2:
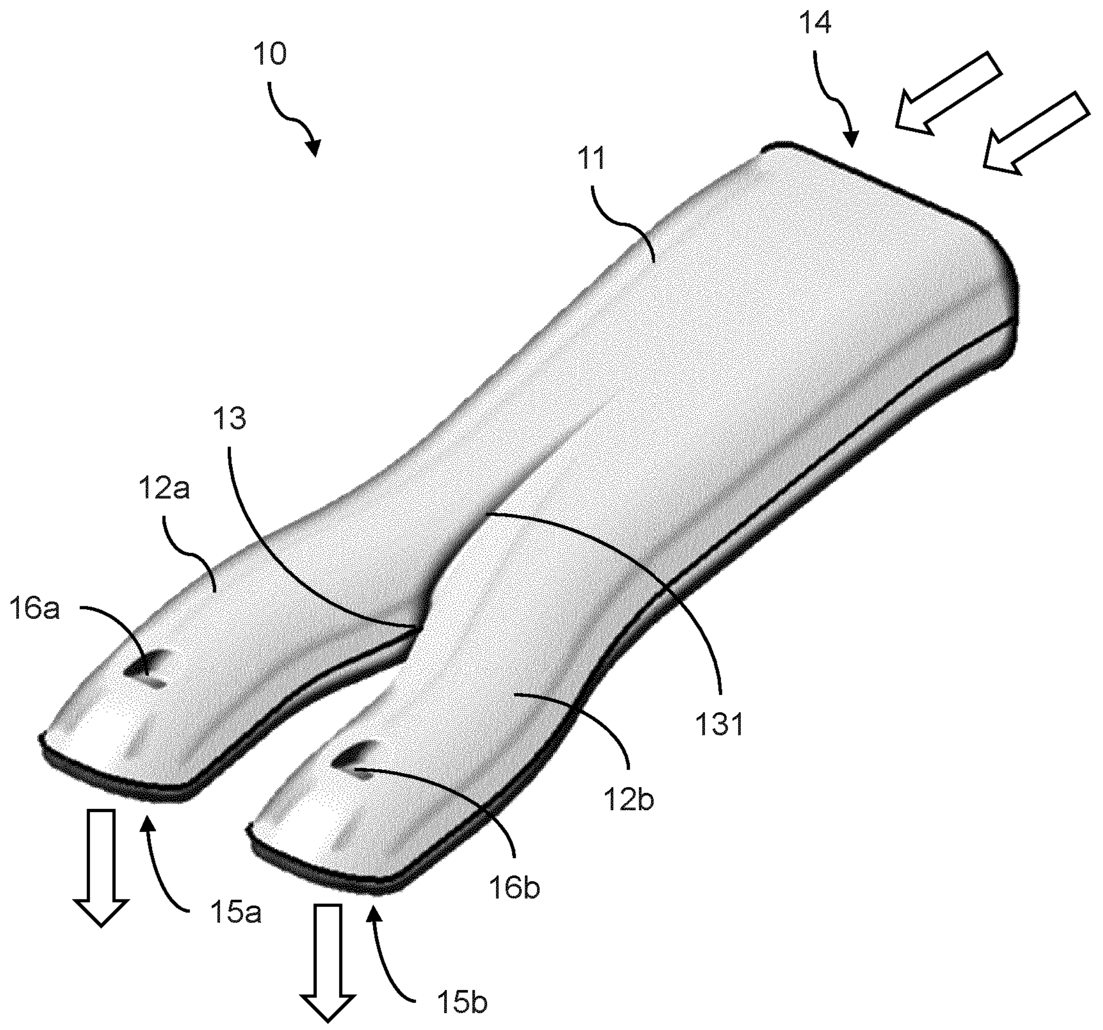
FIG. 2 shows an air intake port according to an embodiment of the invention.

FIG. 2 shows an air intake port 10 according to an embodiment of the invention. The air intake port 10 has an air inlet 14 and two air outlets 15*a*, 15*b*. An air channel connects the air inlet 14 to the two air outlets 15*a*, 15*b*. The first, upstream portion of the air channel, starting at the air inlet 14 forms a common duct 11. Ata bifurcation point 13, at a downstream end of the common duct 11, the common duct 11 branches off in two port legs 12*a*, 12*b* that provide the two respective air outlets 15*a*, 15*b*. The terms upstream and downstream are used to refer to parts of the air intake port 10 relative to flow of air through the air intake port 10 in its normal use with a lean-burn gasoline engine 110. The predominant air flow direction is from an upstream position to a downstream position. It follows that in normal use the engine 110 is downstream of the air intake port 10. The air outlets 15*a*, 15*b* are configured to connect to two respective inlets of the combustion chamber. Near the downstream ends of the port legs 12*a*, 12*b*, two valve guides 16*a*, 16 are provided, each being configured to receive a valve stem that is used for controlling the valve that selectively opens and closes the combustion chamber inlets.

Figure 3:
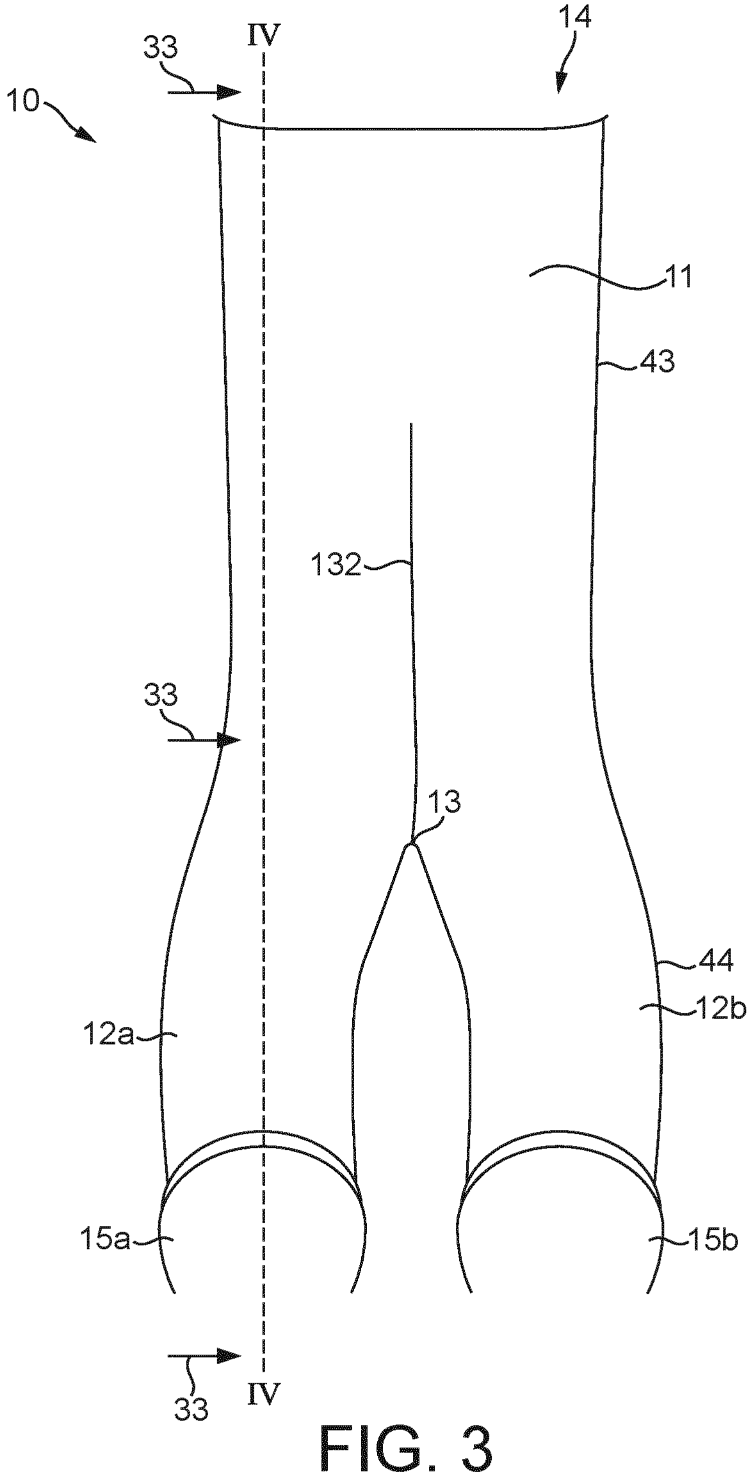
FIG. 3 schematically shows a bottom view of the air intake port of FIG. 2.
Figure 4A:
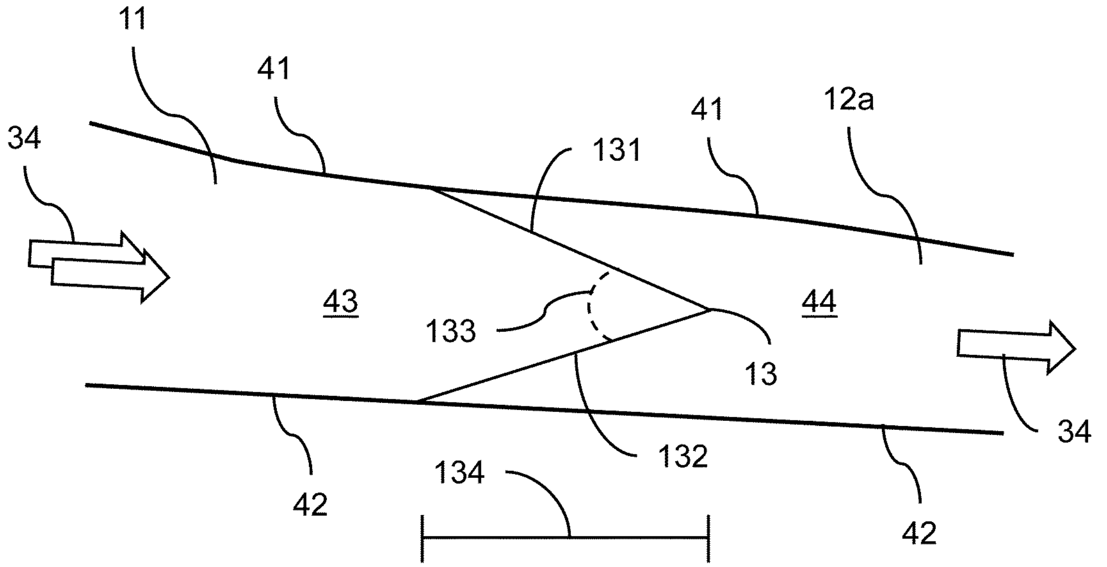
FIGS. 4*a* and 4*b* schematically show side views from the plane IV-IV as shown in FIG. 3, into the inside of the air intake port of FIGS. 2 and 3.
Figure 4B:
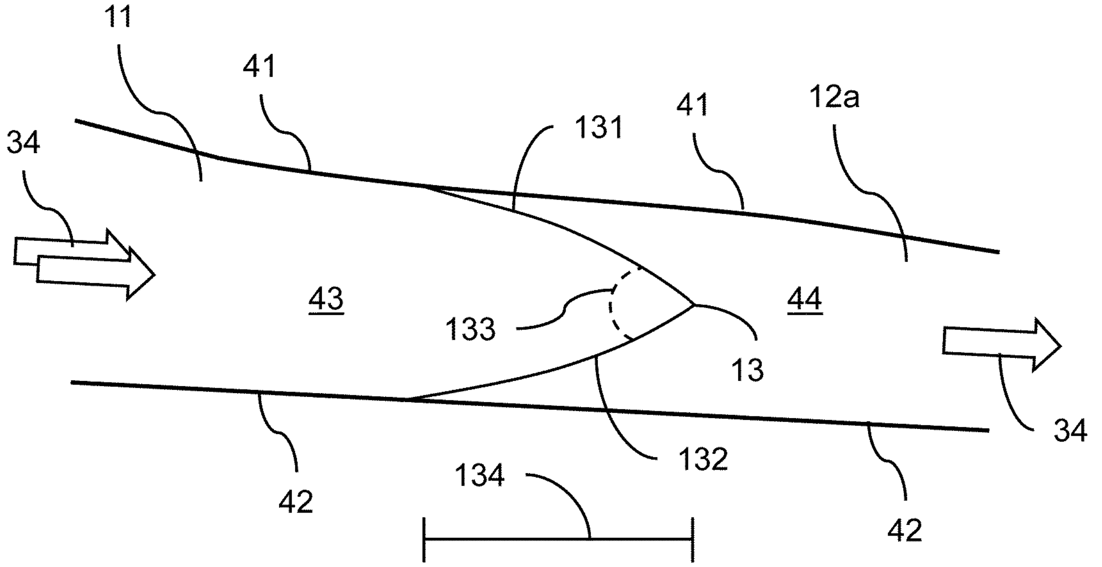

FIG. 3 schematically shows a bottom view of the air intake port 10 of FIG. 2. In addition to what has already been shown in and described with reference to FIG. 2, FIG. 3 shows the air outlets 15*a*, 15*b*, and a sloped portion 132 in the common duct floor which leads to the bifurcation point 13. FIG. 3 further shows a plane IV-IV through the air intake port 10, from which the views on the inside of the air intake port 10 as shown in FIGS. 4*a* and 4*b* are. In addition thereto, FIG. 3 indicates, with three arrows 33, the direction from which the cross section is viewed in the view of FIGS. 4*a* and 4*b*.

The side views shown in FIGS. 4*a* and 4*b* thus show the inside of the air intake port 10 as seen from the plane IV-IV indicated in FIG. 3. As will be explained below, FIGS. 4*a* and 4*b* show two slightly different embodiments of the sharp bifurcation angle 133 according to the invention. From this viewpoint inside the common duct 11, we look directly upon a side wall 43 of the common duct 11 and a side wall 44 of one of the leg ports 12*a*. In addition to a side walls 43, 44, the common duct 11 and the port legs 12*a*, 12*b* may have a ceiling 41, a floor 42, and another side wall (not shown). It is noted that the common duct 11 and the port legs 12*a* are preferably not rectangularly shaped. Depending on the exact shape of the air intake port 10, the boundaries of its floor 42, side walls 43, 44, and ceiling 41 may not be easy to define. The common duct 11 and the port legs 12*a*, 12*b* may, e.g., be tubular, oval, rectangular with rounded corners, or have flat floors 42 and/or ceilings 41 with curved side walls. Combinations and variations of such shapes are possible too. In preferred embodiments, however, at least the floor 42 of the common duct 11 is substantially flat.

In prior art air intake ports with one air intake and two air outlets, the bifurcation point is typically formed as a straight and substantially vertical wall or pillar that connects the air intake floor 42 to the air intake ceiling 41. This vertical wall is situated centrally in the air intake port 10, at the end of the common duct 11. From there, the two port legs 12*a*, 12*b* and there opposing inner walls diverge.

In this case, as can be seen in the side views of FIGS. 4*a* and 4*b*, the bifurcation is a gradual transition and not, as in the prior art, a straight wall perpendicular to the air flow 34 through the common duct 11. In a transition zone 134 at the downstream end of the common duct 11, and in or around the centreline of the common duct 11, the ceiling 41 and the floor 42 of the common duct 11 start approaching each other, until the sloped portions 131, 132 of the ceiling 41 and the floor 42 meet each other in the bifurcation point 13. If these sloped portions 131, 132 are sufficiently long, they make a sharp bifurcation angle 133 at this bifurcation point 13. The inventors have found that with such a sharp bifurcation angle, the air flow 34 is allowed to split in two, with far less disturbance than if the bifurcation is formed by a simple vertical wall (or an approximation thereof). In order to achieve this advantageous effect, a bifurcation angle 133 of less than 90° is preferred, however even better results may be obtained with even sharper bifurcation angles of, e.g., less than 75° 55°, or 45°.

In this example, the bifurcation point 13 is located centrally in the common duct 11, i.e. midway between the two side walls and at equal distances from the floor 42 and the ceiling 41. However, other, less symmetric configurations may be provided without departing from the scope of the invention. For example, the bifurcation point 13 may be positioned somewhat closer to the floor 42, the sloped portion 131 at the ceiling 41 being steeper and/or longer than the sloped portion 132 near the floor 42. In other embodiments the bifurcation point 13 may be somewhat rounded to further reduce air flow disturbances and/or because manufacturing constraints. It is noted that in the event of a slightly rounded bifurcation point 13, the bifurcation angle 133 may be defined as the angle between the duct floor 42 and the duct ceiling 41 measured at a point beyond the rounded edge, e.g. at a position of 5 mm in front of the bifurcation point.

The sloped portions 131, 132 in the floor and ceiling of the common duct 11 may be substantially straight or curved. In addition to a slope in the longitudinal direction, i.e. in the direction of the air flow, the sloped portions 131, 132 are preferably sloped in the transverse direction too, thereby forming an aerodynamically shaped wedge-like structure.

According to the invention, the air channel floor 42 of the air intake port 10 of FIGS. 4*a* and 4*b* is at least substantially flat in a direction of flow in a region adjacent to the air outlet 15*a*, 15*b*, but preferably along the whole port leg 15*a*, 15*b* and part or the whole common duct 11 too. The purpose of this flat and even air channel floor 42 is to achieve a stable and undisturbed high-volume air flow that detaches from the underlying surface 42 and is launched into the combustion chamber when reaching the end of the air intake port 10. The term 'substantially flat' may herein, e.g., be defined as having a difference between a minimum inclination and a maximum inclination that is less than 5 degrees.

Preferably, the flat portion of the air channel floor is designed such that the difference between the minimum and maximum inclination is less than 2, or even 1, degrees. In the example shown, the flat air channel floor 42 is a completely straight floor 42 with a constant inclination. In the event of a non-rectangular air channel, it may be difficult to distinguish the exact transition between the floor 42, walls 43, 44, and ceiling 41 of the air channel. To obtain the described benefits of the described flat floor 42, at least the central and lowest portion of the air channel is designed to be flat. Preferably, however, the floor 42 has a similar flatness in the direction of flow over at least half or even the full width of the air intake port 10. With an air channel floor 42 that is at least substantially flat in a direction of flow in a region adjacent to the air outlet 15*a*, 15*b*, flow separation at the combustion chamber inlet significantly improved, thereby allowing the incoming air to first flow across the chamber before descending into the chamber. As a result, the desired tumble is achieved. This tumble is shown and discussed in more detail with reference to FIG. 5.

It is noted that while the embodiments shown in FIGS. 4*a* and 4*b*, have this sloped or curved portion 132 that provides for a smooth transition towards the bifurcation point 13, this will still allow for the floor 42 of the common duct 11 to be at least substantially flat in a direction of air flow. The portions 132 that are sloped or curved part of the side wall 44 separating the two port legs 12*a*, 12*b*. The air flow at either side of that side wall 44 can still follow a substantially flat floor 42 in the air flow direction. It is further to be noted that the now presented design of the bifurcation 13 and the substantially flat duct floor 42 both help to provide a stable and undisturbed high-volume air flow that detaches from the underlying surface 42 and is launched into the combustion chamber 50 when reaching the end of the air intake port 10. Both measures add to the same technical effect that is already obtained by the use of a substantially flat floor 42 in at least a downstream portion of the port legs 12*a*, 12*b*. However, the advantageous effects of a substantially flat floor 42 in the common duct can also be obtained with a vertical wall type bifurcation.

Figure 5:
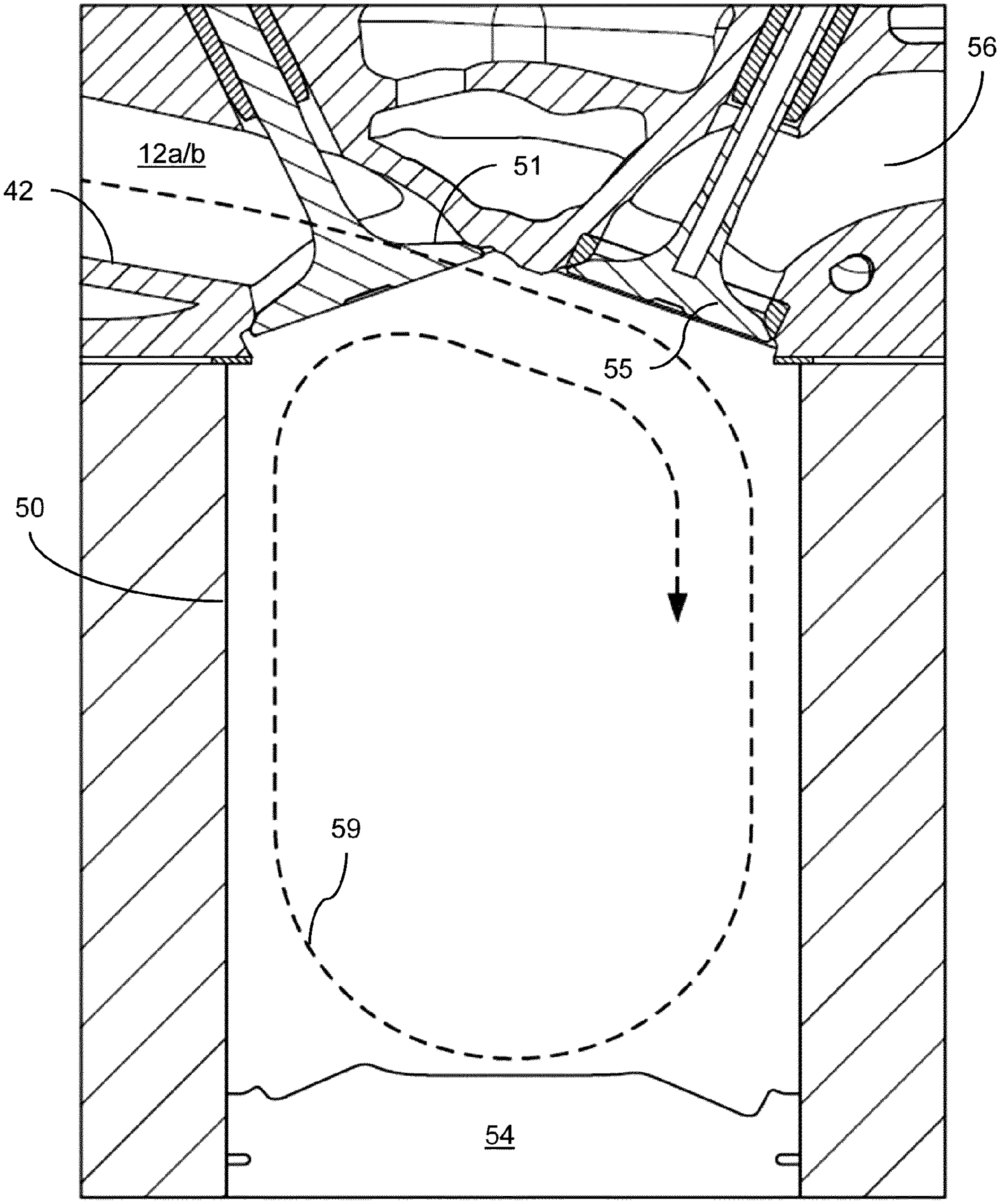
FIG. 5 shows a cross section of a combustion chamber with a retracted piston and a closed inlet valve.

FIG. 5 shows a cross section of a combustion chamber 50 with a retracted piston 54 and a closed inlet valve 51. A dotted line 59 provides a simplified 2D representation of the preferred air flow into and through the combustion chamber 50. It is noted that the air flow into the combustion chamber 50 is not possible with a closed inlet valve 51 but is shown for the purpose of illustration only, shows a cross section of a combustion chamber 50 with a retracted piston 54 and a closed inlet valve 51.

With the valve 51 and air inlet design of this embodiment, it is possible to create a tumble motion of the incoming air, first along the roof of the combustion chamber 50 towards the opposite wall, under the outlet valve 55 that closes off the exhaust outlet 56, and then down along that opposing wall, back over the top surface of the piston 54 and up along the combustion chamber wall in the direction of the inlet valve 51 again. This tumble is preferably kept in motion during the full intake stroke and at least a portion of the compression stroke of the piston 54 moving through the combustion chamber 50. The thus produced tumble helps to obtain an optimal distribution of air and fuel inside the combustion chamber 50 that can then break down into turbulence to facilitate the subsequent combustion process.

In order to create the desired tumble, the valve 51 and the air inlet of the combustion chamber 50 are designed such that the air flow entering the combustion chamber 50 is promoted to detach from the floor of the port leg 12*a*, 12*b* of the air intake port 10 and to flow along the ceiling of the combustion chamber 50. Some of the specific design features that can help to promote the desired tumble are discussed below with reference to FIGS. 6, 7*a*, and 7*b*.

Figure 6:
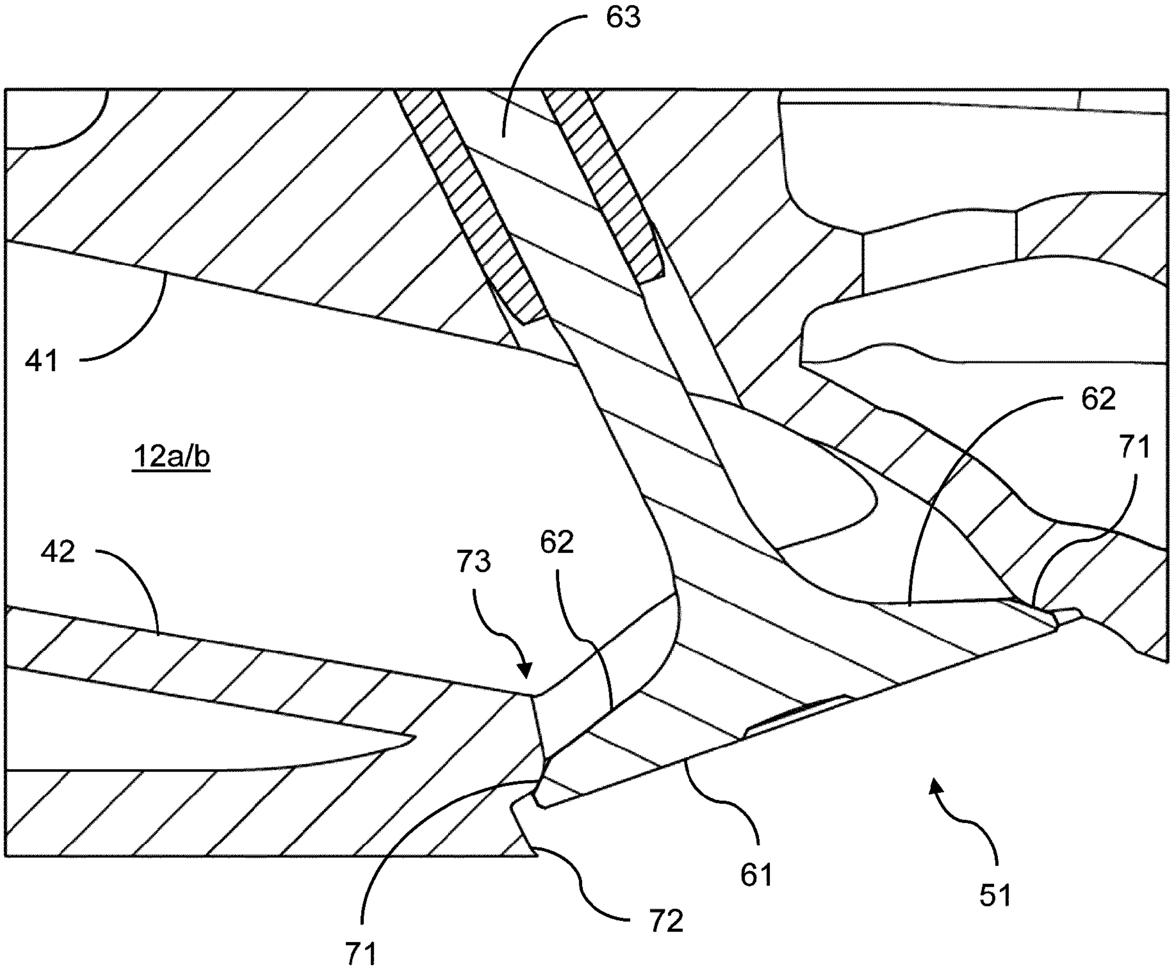
FIG. 6 shows a close-up of the inlet valve of FIG. 5.
Figure 7A:
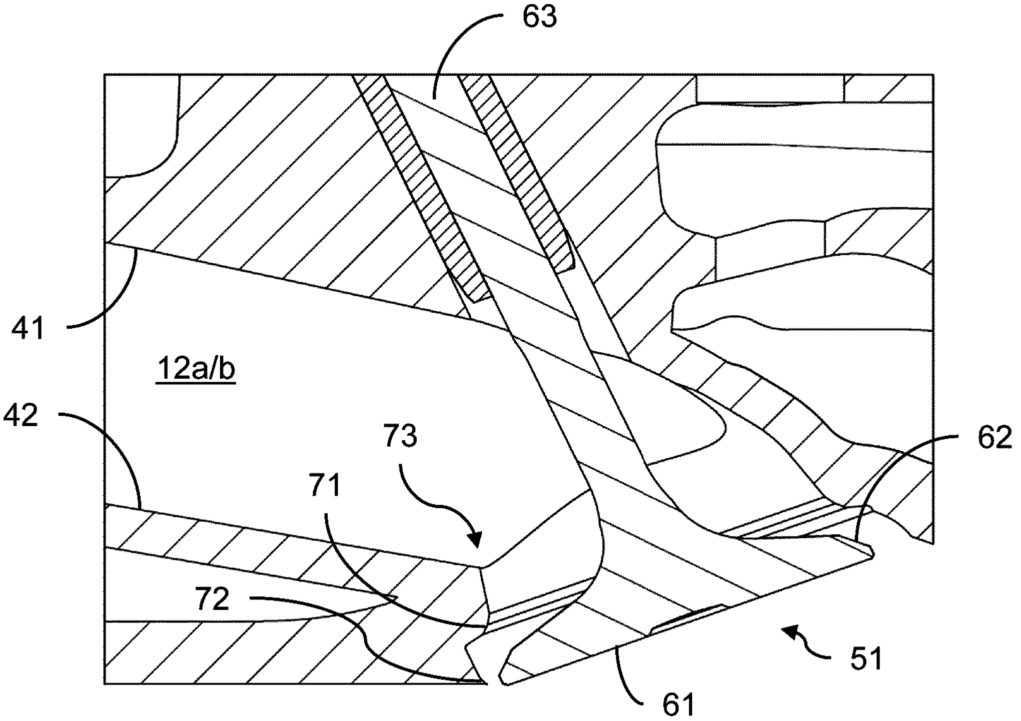
FIG. 7*a* shows the inlet valve of FIG. 6 in a partially opened position.
Figure 7B:
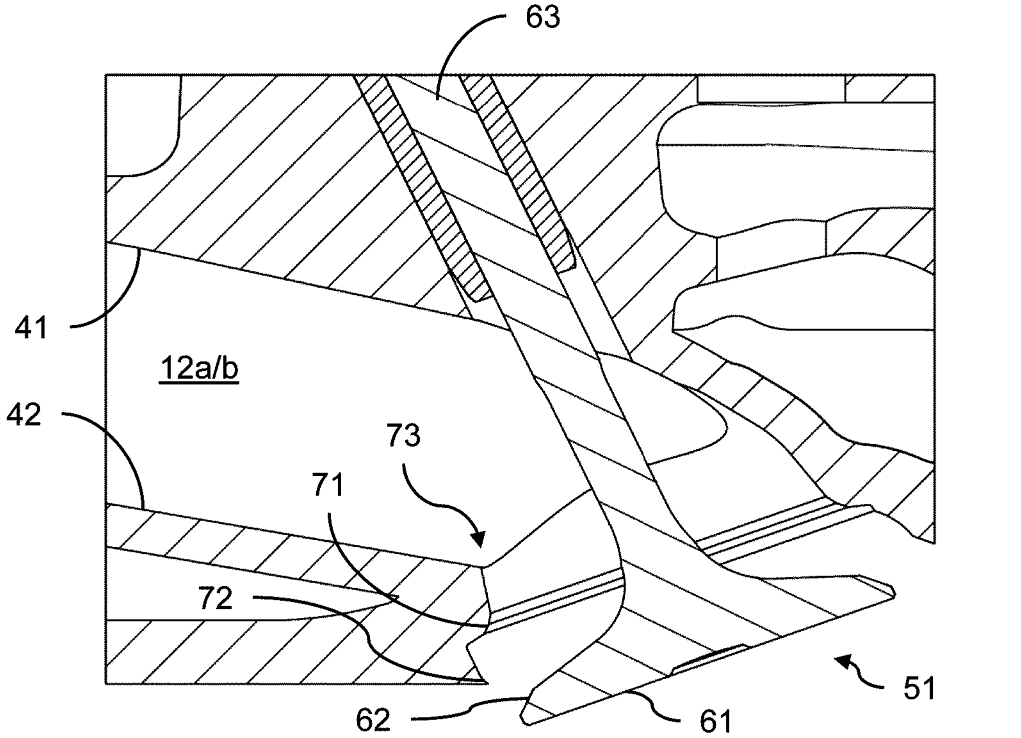
FIG. 7*b* shows the inlet valve of FIGS. 6 and 7*a*, in a more open position.

FIGS. 6, 7*a*, and 7*b* shows a close-up of the inlet valve 51 of FIG. 5. As can be seen in all these Figures, the air channel floor 42 of the port leg 12*a*, 12*b* is flat in the full region up to the air outlet 15*a*, 15*b* of the air intake port 10. The flat air channel floor 42 promotes the detachment of the air flow as soon as it leaves the air intake port 10 and enters the combustion chamber 50, which contributes to the desired tumble.

The movable valve 51 comprises a bottom surface 61 that faces the combustion chamber 50 and a tapered top surface 62 that faces the air intake port 10. The inlet valve 51 is provided at the end of a valve stem 63. This inlet valve 51 is arranged to move by controlling the position of the valve stem 63. The movable valve 51 may be moved between a closed state (FIG. 6) for closing off the combustion chamber inlet and an opened state (FIGS. 7*a* and 7*b*) wherein intake air can flow from the air intake port 10 into the combustion chamber 50. The throat comprises a tapered surface 71 that is complementary with the tapered top surface 62 of the movable valve 51, such that when the movable valve 51 is in its closed position, the movable valve 51 at least partially sinks into the throat.

This tumble is preferably kept in motion during the full intake stroke and at least a portion of the compression stroke of the piston 54 moving through the combustion chamber 50. The complementary tapered surfaces 62, 71 of the intake valve 51 and the throat together ensure that during the compression stroke, when the intake valve 51 is closed, no or little air can get trapped behind the valve 51 or between the valve 51 and an inner surface of the combustion chamber 50 while tumbling through the combustion chamber 50. The further the valve 51 is allowed to sink into the throat, the less disturbance it can cause to the desired tumble. In an embodiment of the invention, the bottom surface 61 of the movable valve 51 may even be substantially flush with an inner surface of the combustion chamber 50 when the movable valve 51 is in its closed position.

Due to the tapered surface of the throat, and because the valve 51 needs to be able to close off the air inlet, the diameter of the combustion chamber inlet is smaller than the valve diameter. The valve diameter is determined by the bottom surface 61 of the valve 51. In an embodiment of the invention, the diameter of the combustion chamber inlet is less than, e.g., 95% or 90% of a diameter of the bottom surface 61 of the movable valve 51. Not only does this allow for the desired taper 71 in the throat surface, the protruding upstream portion of the throat also helps to shield of the valve edge, thereby directing the air flow over the top surface 62 of the valve 51 (see FIG. 7*a*) and along the roof of the combustion chamber 50 instead of around the valve edge and down along the wall closest to the combustion chamber inlet.

This effect can further be enhanced by the protruding upstream portion ending with a sharp edge 73 that promotes detachment of the air flow. In this example, the sharp edge 73 coincides with the outer end of the air channel floor 42 at the air outlet 15*a*, 15*b* of the air intake port 10.

While this is the preferred embodiment, the channel floor 42 may alternatively end at a position in front of or behind the sharp edge 73. In preferred embodiments, the angle between the channel floor 42 and an adjacent portion of the throat is at least 225 degrees. However, angles closer to, or even beyond, 270 degrees are even more preferred. The larger the angle, the smaller the chance that the airflow will adhere to the throat surface and finds a way down into the combustion chamber 50 immediately upon entering.

Additionally, an optional deflector 72 is provided at an inner wall of the combustion chamber 50 and protruding radially therefrom. The deflector 72 is positioned underneath an outer edge of the bottom surface 61 of the movable valve 51. This deflector 72 is arranged such that an air flow moving up along the inner wall of the combustion chamber 50 is deflected radially inward and away from the outer edge of the bottom surface 61 of the movable valve 51. As a result, the risk of any air being trapped behind the valve 51 when in a closed or almost closed position is reduced. This useful deflector 72, on top of that, brings the additional advantage that during the intake stroke, when the valve 51 is at least partially open and air is drawn into the combustion chamber 50, any air unintentionally bouncing of the top surface 62 of the valve 51 will be prevented from flowing down along the nearest inner wall of the combustion chamber 50. Instead, the deflector 72 will block this astray air flow back into the chamber 50, and in the direction of the desired tumble.

In a preferred embodiment of this lean-burn gasoline engine 110, the air intake port 10 and the valve 51 are arranged such that when the valve 51 is in its opened position, the complete bottom surface of the valve 51 is positioned below the air intake port 10. This allows the separated air flow leaving the air intake port 10 to flow along the roof of the combustion chamber 50 and towards the opposite chamber wall with minimal disturbance by the valve 51 it has to pass. In an even more preferred embodiment, the complete bottom surface 61 of the valve 51 is already positioned below the air intake port 10 when the valve 51 is only half-way between its closed position and its opened position. This further allows reduced flow disturbance by the valve 51 while the valve is still opening, thereby facilitating the creation of the desired tumble as soon as the valve 51 is opened. In alternative embodiments, the complete bottom surface 61 drops below the air intake port 10 when the valve is, e.g., 60% open.

In a further embodiment, the air intake port 10 and the valve 51 are arranged such that when the valve 51 is in its opened position, also the complete top surface 62 of the valve 51 is positioned below the air intake port 10, with the tapered angle of the top surface 62 at a similar angle as the port floor, which leads to even less disturbance of the air flow, and helps to direct the air flow across the top of the chamber, with a more prominent and stable tumble as a result. The top surface 62 may be inclined slightly upward at the point where the air flow may hit the valve 51 in order to lift the air flow up in the direction of the chamber ceiling and/or the top end of the opposing wall.

It will be appreciated that various changes and modifications can be made to the present invention without departing from the scope of the present application.

The invention claimed is:

1. A lean-burn gasoline engine comprising;

at least one air intake port, the at least one air intake port comprising an air inlet, at least one air outlet, and an air channel connecting the air inlet to the at least one air outlet, the air channel comprising an air channel floor and an air channel ceiling, wherein the air channel floor is at least substantially flat in a direction of air flow in a region adjacent to the air outlet;

a combustion chamber with at least one air inlet being connected to the at least one air outlet of the air intake port, the air inlet of the combustion chamber comprising a throat where the air outlet of the air intake port meets the air inlet of the combustion chamber; and a movable valve being arranged to move between a closed state for closing off the air inlet of the combustion chamber and an opened state wherein intake air can flow from the air intake port into the combustion chamber, the throat providing a smooth edge with the channel ceiling, such as to adhere an incoming air flow to a combustion chamber ceiling.

2. A lean-burn gasoline engine according to claim 1, wherein the valve comprises a bottom surface that faces the combustion chamber and a top surface that faces the air intake port, and wherein the air intake port and the valve are arranged such that when the valve is in its opened position, the complete bottom surface of the valve is positioned below the air intake port.

3. A lean-burn gasoline engine according to claim 2, wherein the air intake port and the valve are arranged such that when the valve is half-way between the closed state and the opened state, the complete bottom surface of the valve is positioned below the air intake port.

4. A lean-burn gasoline engine according to claim 2, wherein the air intake port and the valve are arranged such that when the valve is in the opened state, the complete top surface of the valve is positioned below the air intake port.

5. A lean-burn gasoline engine according to claim 1, wherein the throat provides a sharp edge with the channel floor, such as to promote a separation of an incoming air flow from a combustion chamber wall.

6. A lean-burn gasoline engine according to claim 1, wherein an angle between the channel floor and an adjacent portion of the throat is at least 225 degrees.

7. A lean-burn gasoline engine comprising;

at least one air intake port, the at least one air intake port comprising an air inlet, at least one air outlet, and an air channel connecting the air inlet to the at least one air outlet, the air channel comprising an air channel floor and an air channel ceiling, wherein the air channel floor is at least substantially flat in a direction of air flow in a region adjacent to the air outlet;

a combustion chamber with at least one air inlet being connected to the at least one air outlet of the air intake port, the air inlet of the combustion chamber comprising a throat where the air outlet of the air intake port meets the air inlet of the combustion chamber; and a movable valve being arranged to move between a closed state for closing off the air inlet of the combustion chamber and an opened state wherein intake air can flow from the air intake port into the combustion chamber wherein the throat provides a smooth edge with the channel ceiling, such as to adhere an incoming air flow to a combustion chamber ceiling, the valve comprising a bottom surface that faces the combustion chamber and a top surface that faces the air intake port, and wherein the air intake port and the valve are arranged such that when the valve is in the opened state, the complete bottom surface of the valve is positioned below the air intake port, and the throat providing a sharp edge with the channel floor, such as to promote a separation of an incoming air flow from a combustion chamber wall.

8. A lean-burn gasoline engine;

at least one air intake port, the at least one air intake port comprising an air inlet, at least one air outlet, and an air channel connecting the air inlet to the at least one air outlet, the air channel comprising an air channel floor and an air channel ceiling, wherein the air channel floor is at least substantially flat in a direction of air flow in a region adjacent to the air outlet;

a combustion chamber with at least one air inlet being connected to the at least one air outlet of the air intake port, the air inlet of the combustion chamber comprising a throat where the air outlet of the air intake port meets the air inlet of the combustion chamber; and a movable valve being arranged to move between a closed state for closing off the air inlet of the combustion chamber and an opened state wherein intake air can flow from the air intake port into the combustion chamber, wherein the throat provides a sharp edge with the channel floor, such as to promote a separation of an incoming air flow from a combustion chamber wall, and wherein the throat provides a smooth edge with the channel ceiling, such as to adhere an incoming air flow to a combustion chamber ceiling.

9. A lean-burn gasoline engine according to claim 8, wherein an angle between the channel floor and an adjacent portion of the throat is at least 225 degrees.

10. A vehicle comprising a lean-burn gasoline engine according to claim 1.

* * * * *